US012712791B2

(12) United States Patent
Rune et al.

(10) Patent No.: US 12,712,791 B2
(45) Date of Patent: Aug. 18, 2026

(54) SIMULTANEOUS QUALITY OF EXPERIENCE MEASUREMENT CONFIGURATIONS FOR INCAPABLE USER EQUIPMENTS

(71) Applicant: Telefonaktiebolaget LM Ericsson (publ), Stockholm (SE)

(72) Inventors: Johan Rune, Lidingö (SE); Luca Lunardi, Genoa (IT); Filip Barac, Huddinge (SE); Ali Parichehrehteroujeni, Linköping (SE); Cecilia Eklöf, Täby (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 502 days.

(21) Appl. No.: 18/031,896

(22) PCT Filed: Oct. 18, 2021

(86) PCT No.: PCT/IB2021/059578
§ 371 (c)(1),
(2) Date: Apr. 14, 2023

(87) PCT Pub. No.: WO2022/084829
PCT Pub. Date: Apr. 28, 2022

(65) Prior Publication Data

US 2023/0403590 A1 Dec. 14, 2023

Related U.S. Application Data

(60) Provisional application No. 63/104,031, filed on Oct. 22, 2020.

(51) Int. Cl.

| | |
|---|---|
| ***H04L 41/5067*** | (2022.01) |
| ***H04W 24/08*** | (2009.01) |
| ***H04W 24/10*** | (2009.01) |

(52) U.S. Cl.
CPC ......... *H04L 41/5067* (2013.01); *H04W 24/08* (2013.01); *H04W 24/10* (2013.01)

(58) Field of Classification Search
CPC .... H04L 41/5067; H04W 24/08; H04W 24/10
See application file for complete search history.

(56) References Cited

U.S. PATENT DOCUMENTS

2021/0297314 A1* 9/2021 Stefanatos .............. H04W 4/40
2022/0417780 A1* 12/2022 Liu ....................... H04W 24/10

FOREIGN PATENT DOCUMENTS

WO 2010000946 A1 1/2010

OTHER PUBLICATIONS

International Search Report and Written Opinion of the International Searching Authority, PCT/IB2021/059578, mailed Dec. 21, 2021, 14 pages.

(Continued)

*Primary Examiner* — Benjamin H Elliott, IV
*Assistant Examiner* — Tracy Lauren Raimondo
(74) *Attorney, Agent, or Firm* — Sage Patent Group

(57) ABSTRACT

A method of operating a UE in a wireless communication network, includes obtaining time sharing configuration for quality of experience (QoE) measurements. The method further includes performing QoE measurements time divided between multiple applications and/or multiple application data flows processed by the UE, wherein the QoE measurements are time divided based on the time sharing configuration. Another related method of operating a network node in a wireless communication network, includes generating a time sharing configuration defining time divided QoE measurements to be performed by a UE for multiple applications and/or multiple application data flows processed by the UE, and providing the time sharing configuration to the UE.

20 Claims, 6 Drawing Sheets

(56) References Cited

OTHER PUBLICATIONS

Ericsson, "Discussion in incoming LS for QoE measuremnet collection in LTE," 3GPP TSG RAN WG2 #107bis, R2-1912638, Chongqing, China, Oct. 14-18, 2019, 6 pages.
Ericsson, "pCR for TR 38.8xx: NR QoE Measurement Triggering, Configuration, Collection and Reporting," 3GPP TSG-RAN WG3 Meeting #109-e, R3-205201, Online, Aug. 17-27, 2020, 6 pages.
3GPP TS 36.331 v16.2.1 (Sep. 2020); 3rd Generation Partnership Project; Technical Specification Group Radio Access Network; Evolved Universal Terrestrial Radio Access (E-UTRA); Radio Resource Control (RRC); Protocol specification (Release 16); 1081 pages.
3GPP TS 26.114 v16.7.0 (Sep. 2020); 3rd Generation Partnership Project; Technical Specification Group Services and System Aspects; IP Multimedia Subsystem (IMS); Multimedia Telephony; Media handling and interaction (Release 16); 445 pages.
3GPP TS 26.247 v16.4.1 (Oct. 2020); 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16); 140 pages.
3GPP TS 28.405 v16.0.0 (Jul. 2020); 3rd Generation Partnership Project; Technical Specification Group Services and System Aspects; Telecommunication management; Quality of Experience (QoE) measurement collection; Control and configuration (Release 16); 16 pages.
3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.
Ericsson, "QoE measurement collection additions," 3GPP TSG RAN2 Meeting #110, R2-2004624, Electronic meeting, Jun. 1-12, 2020, 80 pages.

* cited by examiner

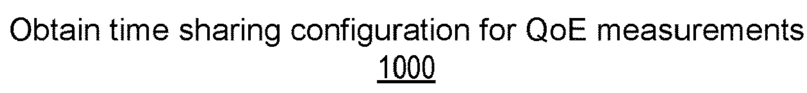

Perform QoE measurements time divided between multiple applications and/or multiple application data flows processed by the UE, where the QoE measurements are time divided based on the time sharing configuration
1002

FIG. 10

Generate a time sharing configuration defining time divided QoE measurements to be performed by a UE for multiple applications and/or multiple application data flows processed by the UE
1100 providing the time sharing configuration to the UE
1102

FIG. 11

Perform opportunistic time sharing between the QoE measurements on the multiple applications and/or multiple application data flows 1200

Determine that during a time period when a QoE measurement is to be performed on one of the multiple applications and/or multiple application data flows, that the one of the one of the multiple applications and/or multiple application data flows is not actively communicating with the wireless communication network
1202

Perform during a remaining portion of the time period a QoE measurement on at least one other one of the multiple applications and/or multiple application data flows processed by the UE
1204

FIG. 12

Perform prioritization of the QoE measurements on the multiple applications and/or multiple application data flows according to a priority order defined based on the time sharing configuration, when more than one of the multiple applications and/or multiple application data flows simultaneously have data actively flowing
1300

FIG. 13

Provide an indication that the UE is to perform prioritization of the QoE measurements on the multiple applications and/or multiple application data flows according to a defined priority order, when more than one of the multiple applications and/or multiple application data flows simultaneously have data actively flowing

FIG. 14

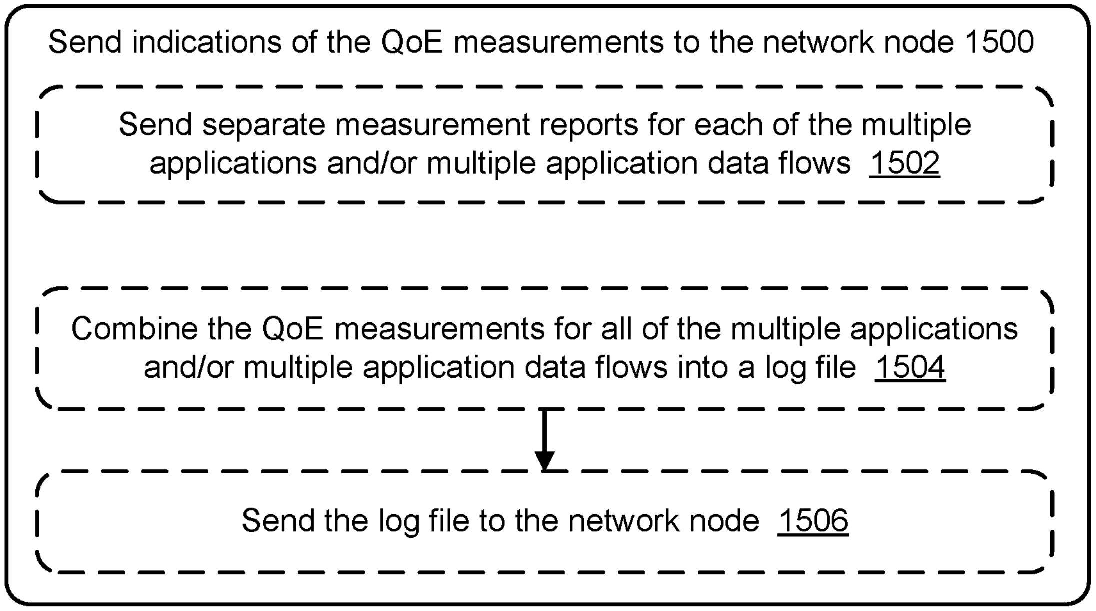

FIG. 15

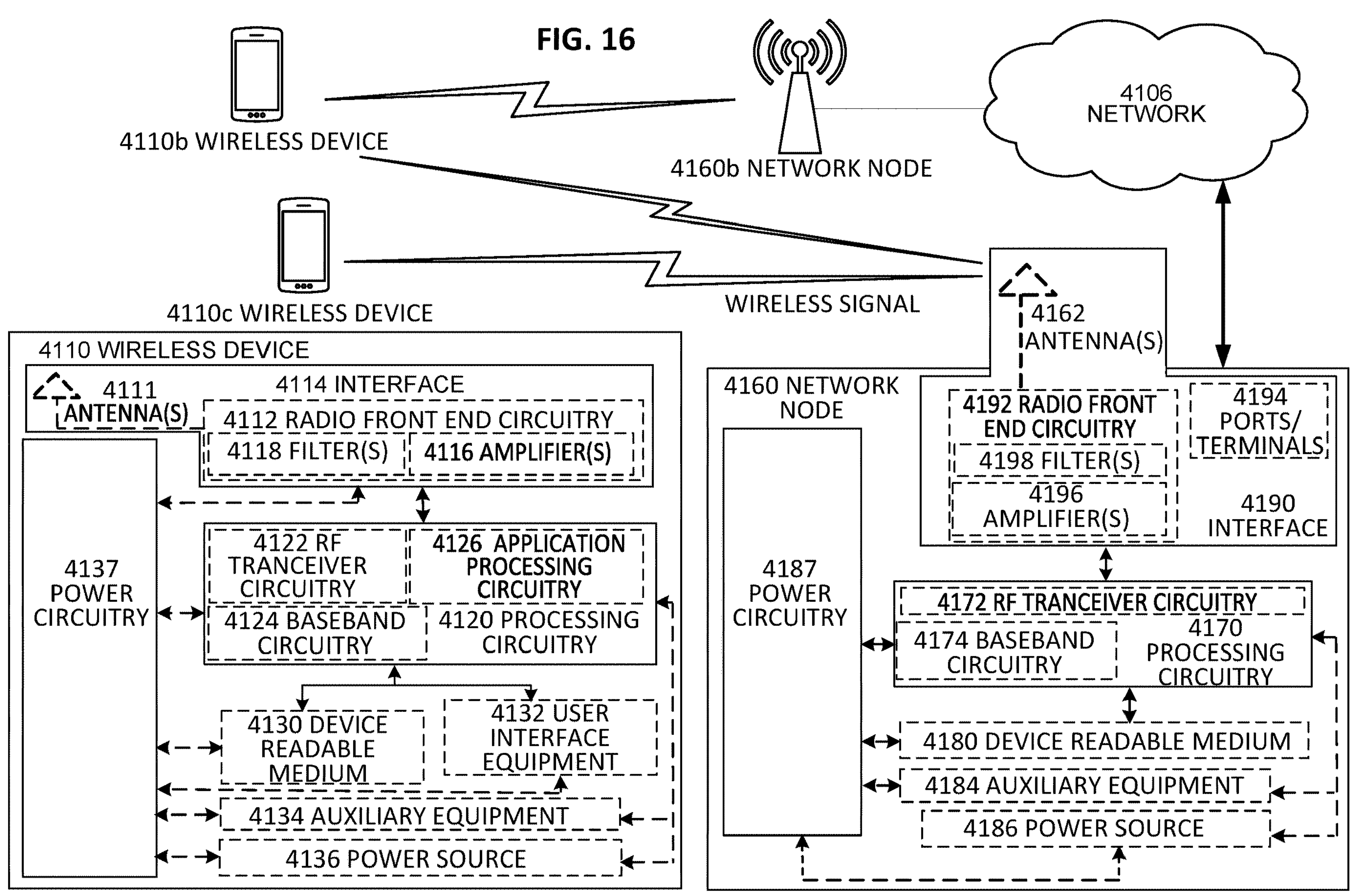
FIG. 16
4110b WIRELESS DEVICE
4160b NETWORK NODE
4106 NETWORK
4110c WIRELESS DEVICE
WIRELESS SIGNAL
4162 ANTENNA(S)
4110 WIRELESS DEVICE
4111 ANTENNA(S)
4114 INTERFACE
4112 RADIO FRONT END CIRCUITRY
4118 FILTER(S)
4116 AMPLIFIER(S)
4137 POWER CIRCUITRY
4122 RF TRANCEIVER CIRCUITRY
4126 APPLICATION PROCESSING CIRCUITRY
4124 BASEBAND CIRCUITRY
4120 PROCESSING CIRCUITRY
4130 DEVICE READABLE MEDIUM
4132 USER INTERFACE EQUIPMENT
4134 AUXILIARY EQUIPMENT
4136 POWER SOURCE
4160 NETWORK NODE
4187 POWER CIRCUITRY
4192 RADIO FRONT END CIRCUITRY
4198 FILTER(S)
4196 AMPLIFIER(S)
4194 PORTS/ TERMINALS
4190 INTERFACE
4172 RF TRANCEIVER CIRCUITRY
4174 BASEBAND CIRCUITRY
4170 PROCESSING CIRCUITRY
4180 DEVICE READABLE MEDIUM
4184 AUXILIARY EQUIPMENT
4186 POWER SOURCE

SIMULTANEOUS QUALITY OF EXPERIENCE MEASUREMENT CONFIGURATIONS FOR INCAPABLE USER EQUIPMENTS

CROSS REFERENCE TO RELATED APPLICATIONS

This application is a 35 U.S.C. § 371 national stage application of PCT International Application No. PCT/IB2021/059578 filed on Oct. 18, 2021, which in turn claims domestic priority to U.S. Provisional Patent Application No. 63/104,031, filed on Oct. 22, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Quality of Experience (QoE) measurements have been specified for LTE and UMTS. The purpose of the application layer measurements is to measure the end user experience when using certain applications. Currently QoE measurements for streaming services and for MTSI (Mobility Telephony Service for IMS) services are supported.

The solutions in LTE and UMTS are similar with the overall principles as follows. Quality of Experience Measurement Collection enables configuration of application layer measurements in the UE and transmission of QoE measurement result files by means of RRC signaling. Application layer measurement configuration received from OAM or CN is encapsulated in a transparent container, which is forwarded to UE in a downlink RRC message. Application layer measurements received from UE's higher layer are encapsulated in a transparent container and sent to network in an uplink RRC message. The result container is forwarded to a TCE, Trace Collector Entity.

In 3GPP release 17 a new study item for "Study on NR QoE management and optimizations for diverse services" for NR has been approved. The purpose of the study item is to study solutions for QoE measurements in NR. QoE management in NR will not just collect the experience parameters of streaming services but also consider the typical performance requirements of diverse services (e.g. AR/VR and URLLC). Based on requirements of services, the NR study will also include more adaptive QoE management schemes that enable network intelligent optimization to satisfy user experience for diverse services.

The measurements may be initiated towards RAN in management-based manner, i.e. from an O&M node in a generic way e.g. for a group of UEs, or they may also be initiated in a signaling-based manner, i.e. initiated from CN to RAN e.g. for a single UE. The configuration of the measurement includes the measurement details, which is encapsulated in a container that is transparent to RAN.

When initiated via the core network, the measurement is started towards a specific UE. For the LTE case, the "TRACE START" S1AP message is used, which carries, among others, the details about the measurement configuration the application should collect (in the "Container for application layer measurement configuration" IE, transparent to the RAN) and the details to reach the trace collection entity to which the measurements should be sent.

RAN is not aware of when the streaming session is ongoing in the UE Access Stratum. The RAN is also not aware of when the measurements are ongoing. It is an implementation decision when RAN stops the measurements. Typically, it is done when the UE has moved outside the measured area.

One opportunity provided by legacy solution is also to be able to keep the QoE measurement for the whole session, even during handover situation.

QoE measurement in UTRAN:

UTRAN—Application layer measurement capabilities:

According to 3GPP TS 25.331, UTRAN can request the UE (via "UE Capability Enquiry") to report its capability, as shown in FIG. 1. FIG. 1 illustrates a UE capability enquiry procedure for UTRAN. The UE can provide its capability using the "UE Capability Information" RRC message as shown in FIG. 2. FIG. 2 illustrates transmission of UE capability information for UTRAN. The "UE Capability Information" message can include the "UE radio access capability" (e.g., such as according 3GPP TS 25.331, Version 16.1.0 (2020 Oct. 9)). The "Measurement Capability" IE can be used from the UE to transfer to the UTRAN the information related to the capability to perform the QoE measurement collection for streaming services and/or MTSI services. UTRAN—QoE measurement configuration—RRC signaling:

To configure QoE measurement in the UE, the UTRAN can send a "Measurement Control" RRC message containing "Application layer measurement configuration", such as shown in FIG. 3. FIG. 3 illustrates measurement Control in normal case for UTRAN.

UTRAN—QoE measurement reporting—RRC signaling:

The UE can send QoE measurement results via UTRAN to the Collecting Entity using the "Measurement Report" RRC message and including the "Application layer measurement reporting" IE. FIG. 4 illustrates a measurement report in normal case for UTRAN.

The UE may also perform Cell Update with cause "application layer measurement report available" in order to initiate the transfer of application layer measurement report.

Signalling radio bearer RB4 shall be used for the MEASUREMENT REPORT message carrying the IE "Application layer measurement reporting".

QoE measurement in E-UTRAN:

E-UTRAN—Application layer measurement capabilities:

For E-UTRAN, the UE capability transfer is used to transfer UE radio access capability information from the UE to E-UTRAN. FIG. 5 illustrates UE capability transfer for E-UTRAN.

The UE-EUTRA-Capability IE is used to convey the E-UTRA UE Radio Access Capability Parameters and the Feature Group Indicators for mandatory features to the network.

In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" encoding below.

The contribution CR 4297 (R2-2004624) for 3GPP TS 36.331 v16.0.0 at the 3GPP TSG RAN2 Meeting #110 proposed an extension of the "UE-EUTRA-Capability" IE that, within the "UE-EUTRA-Capability-v16xy-IE" may include a "measParameters-v16xy" comprising the qoe- Extensions-r16 IE. The qoe-Extensions-r16 IE may be used to indicate whether the UE supports the release 16 extensions for QoE Measurement Collection, i.e. if the UE supports more than one QoE measurement type at a time and if the UE supports the signaling of withinArea, sessionRecordingIndication, qoe-Reference, temporaryStopQoE and restartQoE. E-UTRAN—Application layer measurement reporting: The purpose of the "Application layer measurement reporting" procedure described in 3GPP TS 36.331 is to inform E-UTRAN about application layer measurement report. FIG. 6 illustrates application layer measurement reporting in E-UTRAN.

A UE capable of application layer measurement reporting in RRC_CONNECTED may initiate the procedure when configured with application layer measurement, i.e. when measConfigAppLayer has been configured by E-UTRAN.

E-UTRAN—QoE measurement configuration setup and releaseRRC signaling:

The RRCConnectionReconfiguration message is used to reconfigure the UE to setup or release the UE for Application Layer measurements. This is signaled in the measConfigAppLayer-15 IE within the "OtherConfig" IE.

The setup includes the transparent container measConfigAppLayerContainer which specifies the QoE measurement configuration for the Application of interest and the serviceType IE to indicates the Application (or service) for which the QoE measurements are being configured. Supported services are streaming and MTSI.

The contribution CR 4297 (R2-2004624) for 3GPP TS 36.331 v16.0.0 at the 3GPP TSG RAN2 Meeting #110 proposed to extend the QoE measurement configuration. The measConfigAppLayerToAddModList-r16 may be used to add or modify multiple QoE measurement configurations (up to maxQoE-Measurement-r16). The measConfigAppLayerToReleaseList-r16 IE may be used to remove multiple QoE measurement configuration (up to maxQoE-Measurement-r16). The ServiceType contains the service type of a certain QoE measurement as defined in TS 28.405.

For E-UTRAN, an example of desired UE behavior at reception of the "OtherConfig" IE in the RRCReconfiguration message is described in CR 4297 (R2-2004624).

E-UTRAN—QoE measurement reporting—RRC signaling:

As specified in 3GPP TS 36.331, the MeasReportAppLayer RRC message is used by the UE to send to the E-UTRAN node the QoE measurement results of an Application (or service). The service for which the report is being sent is indicated in the "serviceType" IE.

The contribution CR 4297 (R2-2004624) for 3GPP TS 36.331 v16.0.0 at the 3GPP TSG RAN2 Meeting #110 proposed to extend the MeasReportAppLayer IEs introducing a QoE reference comprising the PLMN identity and the identifier of the QoE Measurement Collection.

For E-UTRAN, an example of desired UE behavior for Application layer measurement reporting is described in CR 4297 (R2-2004624).

Potential problems that may arise with use of existing solutions are now explained. Considering the current framework of QoE measurement, a UE is not expected to perform QoE measurements on more than one application. Nevertheless, allowing configurations of simultaneous QoE measurements on multiple different applications would provide a natural extension of the current framework. However, simultaneous QoE measurements on multiple applications may be computationally and operationally demanding for UEs and even if or when such capability is introduced in the standard, not all UEs can be expected to support it. Still, it would be beneficial for the network, and potentially for the UE too, to be fed with QoE measurement results collected from simultaneously ongoing/active applications.

SUMMARY

Some embodiments of the present disclosure are directed to using various operational schemes for dividing the UE's QoE measurement capacity between multiple applications and/or multiple application data flows. Furthermore, some embodiments use operational schemes for dealing with reporting of QoE measurement results pertaining to QoE measurements performed on multiple (e.g. in parallel ongoing) applications and/or data flows. Some embodiments use a description of how the UE's support (or lack of support) for simultaneous QoE measurements on multiple parallel applications and/or data flows which is signalled to the network using capability signaling. A UE indicating lack of support for simultaneous QoE measurements on multiple parallel applications and/or data flows may further indicate which of the methods in the solution it supports.

Potential advantages that may be provided by one or more of these or other embodiments of the present disclose can include providing efficient and well-structured ways for a UE, which does not support simultaneous QoE measurements on multiple parallel applications and/or data flows, to still operate to handle QoE measurements on multiple parallel applications and/or data flows using various schemes for sharing of the UE's QoE measurement capacity between the different applications and/or data flows.

Various alternative or combinable operational sets of embodiments are now described below.

Some embodiments of the present disclosure directed to a method of operating a UE in a wireless communication network. The method includes obtaining time sharing configuration for quality of experience (QoE) measurements. The method further includes performing QoE measurements time divided between multiple applications and/or multiple application data flows processed by the UE, wherein the QoE measurements are time divided based on the time sharing configuration.

Some other related embodiments are directed to a method of operating a network node in a wireless communication network. The method includes generating a time sharing configuration defining time divided QoE measurements to be performed by a UE for multiple applications and/or multiple application data flows processed by the UE, and providing the time sharing configuration to the UE.

Some other related embodiments are directed to a UE in a wireless communication network. The UE includes processing circuitry and memory coupled to the processing circuitry and having instructions stored therein that are executable by the processing circuitry to cause the UE to perform operations. The operations obtain time sharing configuration for QoE measurements. The operations then perform QoE measurements time divided between multiple applications and/or multiple application data flows processed by the UE, wherein the QoE measurements are time divided based on the time sharing configuration.

Some other related embodiments are directed to a UE in a wireless communication network, where the UE is adapted to perform operations including obtaining time sharing configuration for QoE measurements. The operations further include performing QoE measurements time divided between multiple applications and/or multiple application data flows processed by the UE, wherein the QoE measurements are time divided based on the time sharing configuration.

Some other related embodiments are directed to a computer program comprising program code to be executed by processing circuitry of a UE operating in a wireless communication network, whereby execution of the program code causes the UE to perform operations. The operations include obtaining time sharing configuration for quality of experience, QoE, measurements, and performing QoE measurements time divided between multiple applications and/or multiple application data flows processed by the UE, wherein the QoE measurements are time divided based on the time sharing configuration.

Some other related embodiments are directed to a computer program product comprising a non-transitory storage medium including program code to be executed by processing circuitry of a UE operating in a wireless communication network, whereby execution of the program code causes the UE to perform operations. The operations include obtaining time sharing configuration for QoE measurements. The operations then perform QoE measurements time divided between multiple applications and/or multiple application data flows processed by the UE, wherein the QoE measurements are time divided based on the time sharing configuration.

Some other related embodiments are directed to a network node in a wireless communication network. The network node includes processing circuitry memory coupled to the processing circuitry and having instructions stored therein that are executable by the processing circuitry to cause the network node to perform operations. The operations include generating a time sharing configuration defining time divided QoE measurements to be performed by a UE for multiple applications and/or multiple application data flows processed by the UE, and providing the time sharing configuration to the UE.

Some other related embodiments are directed to a network node in a wireless communication network. The network node is adapted to perform operations including generating a time sharing configuration defining time divided QoE measurements to be performed by a UE for multiple applications and/or multiple application data flows processed by the UE, and providing the time sharing configuration to the UE.

Some other related embodiments are directed to a computer program including program code to be executed by processing circuitry of a network node operating in a wireless communication network, whereby execution of the program code causes the network node to perform operations. The operations include generating a time sharing configuration defining time divided QoE measurements to be performed by a UE for multiple applications and/or multiple application data flows processed by the UE, and providing the time sharing configuration to the UE.

Some other related embodiments are directed to a computer program product comprising a non-transitory storage medium including program code to be executed by processing circuitry of a network node operating in a wireless communication network, whereby execution of the program code causes the network node to perform operations. The operations include generating a time sharing configuration defining time divided QoE measurements to be performed by a UE for multiple applications and/or multiple application data flows processed by the UE, and providing the time sharing configuration to the UE.

It is noted that aspects described with respect to one embodiment may be incorporated in different embodiments although not specifically described relative thereto. That is, all embodiments and/or features of any embodiments can be combined in any way and/or combination. Moreover, other methods, UEs, network nodes, and related computer programs and computer program products according to embodiments will be or become apparent to one with skill in the art upon review of the following drawings and detailed description. It is intended that all such other methods, UEs, network nodes, and related computer programs and computer program products be included within this description and protected by the accompanying claims.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 10 and 11 illustrate flowcharts of operations that are performed by a UE any network node, respectively, in accordance with some embodiments;

FIG. 12 is a flowchart of some further operations by the UE in accordance to some embodiments of the present disclosure;

FIG. 13 is a flowchart of operations by the UE to perform QoE measurements according to a priority order defined based on the time sharing configuration in accordance to some embodiments of the present disclosure;

FIG. 14 is a flowchart of corresponding operations by the network node to control the UE to perform QoE measurements according to a priority order defined based on the time sharing configuration in accordance to some embodiments of the present disclosure;

FIG. 15 illustrates a flowchart of operations that can be performed by a UE to report the QoE measurements to a network node in accordance with some embodiments; and FIG. 16 is a block diagram of a wireless network in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
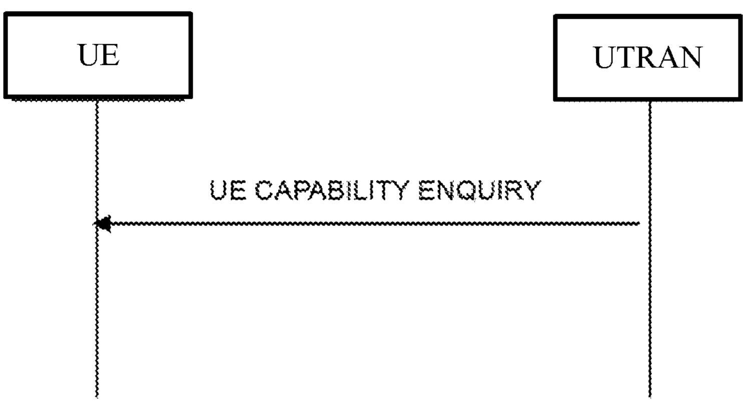
FIG. 1 illustrates a UE capability enquiry procedure for UTRAN.
Figure 2:
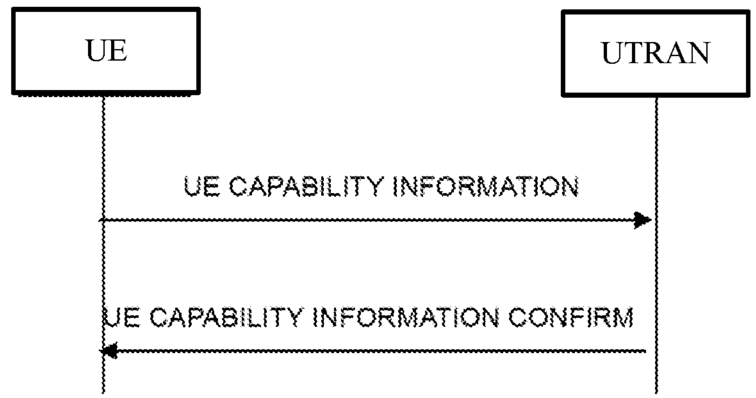
FIG. 2 illustrates transmission of UE capability information for UTRAN.
Figure 3:
FIG. 3 illustrates measurement Control in normal case for UTRAN.
Figure 4:
FIG. 4 illustrates a measurement report in normal case for UTRAN.
Figure 5:
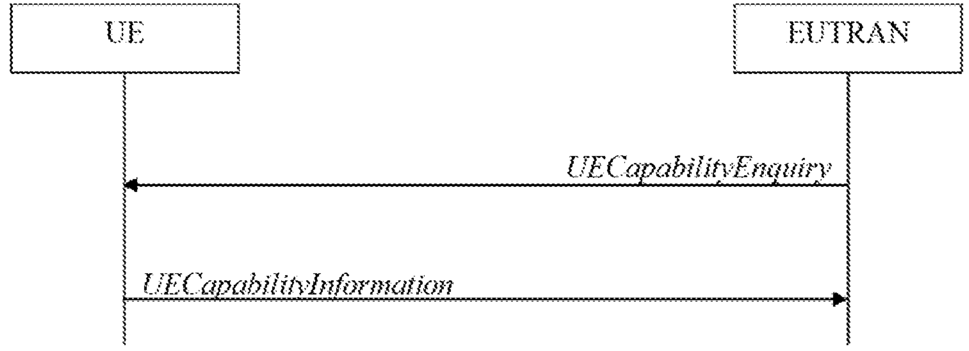
FIG. 5 illustrates UE capability transfer for E-UTRAN.
Figure 6:
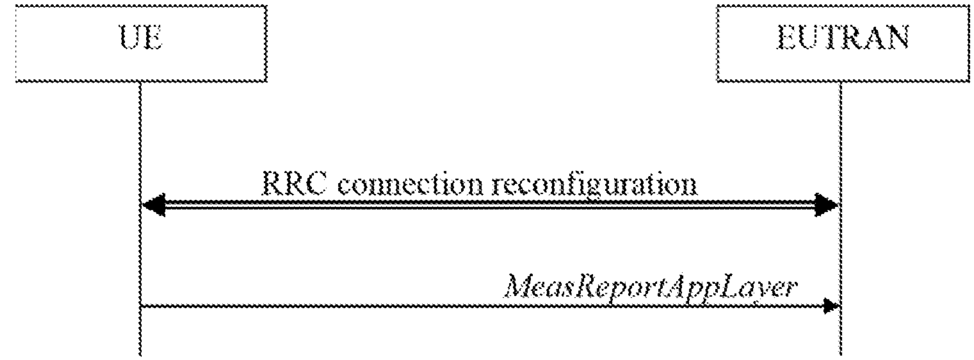
FIG. 6 illustrates application layer measurement reporting in E-UTRAN.
Figure 7:
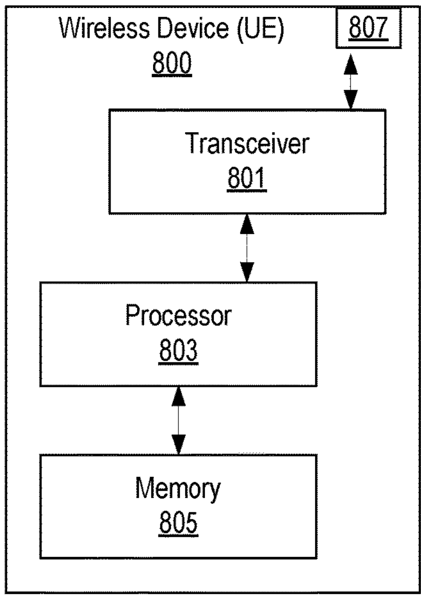
FIG. 7 is a block diagram illustrating a wireless device ("UE") according to some embodiments of inventive concepts.

FIG. 7 is a block diagram illustrating elements of a wireless device 800 (also referred to as a mobile terminal, a mobile communication terminal, a wireless communication device, a wireless terminal, mobile device, a wireless communication terminal, a user equipment ("UE"), a user equipment node/terminal/device, etc.) configured to provide wireless communication according to embodiments of inventive concepts. (Wireless device 800 may be provided, for example, as discussed below with respect to wireless device 4110 of FIG. 16.) As shown, wireless device UE may include an antenna 807 (e.g., corresponding to antenna 4111 of FIG. 16), and transceiver circuitry 801 (also referred to as a transceiver, e.g., corresponding to interface 4114 of FIG. 16) including a transmitter and a receiver configured to provide uplink and downlink radio communications with a base station(s) (e.g., corresponding to network node 4160 of FIG. 16, also referred to as a RAN node) of a radio access network. Wireless device UE may also include processing circuitry 803 (also referred to as a processor, e.g., corresponding to processing circuitry 4120 of FIG. 16) coupled to the transceiver circuitry, and memory circuitry 805 (also referred to as memory, e.g., corresponding to device readable medium 4130 of FIG. 16) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Wireless device UE may also include an interface (such as a user interface) coupled with processing circuitry 803, and/or wireless device UE may be incorporated in a vehicle.

As discussed herein, operations of wireless device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to wireless devices).

Figure 8:
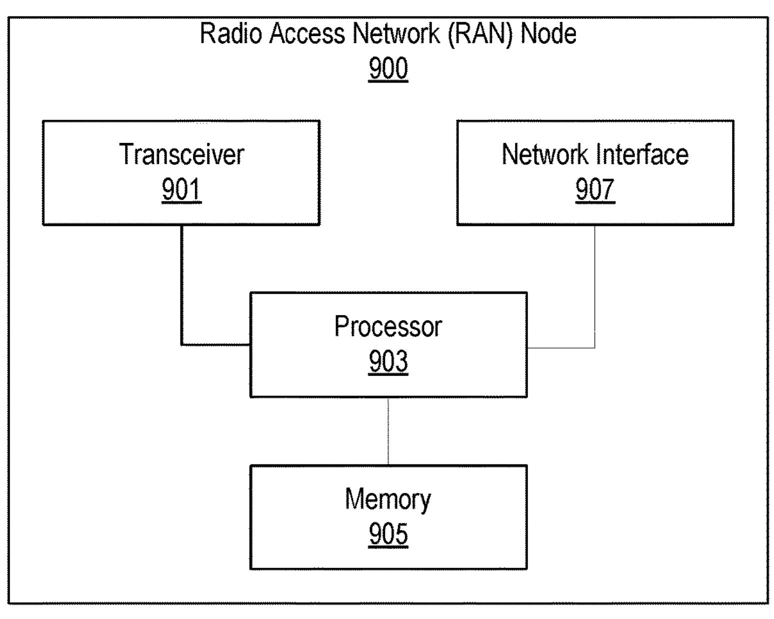
FIG. 8 is a block diagram illustrating a radio access network ("RAN") node according to some embodiments of inventive concepts.

FIG. 8 is a block diagram illustrating elements of a radio access network RAN node 900 (also referred to as a network node, base station, eNodeB/eNB, gNodeB/gNB, etc.) of a Radio Access Network ("RAN") configured to provide cellular communication according to embodiments of inventive concepts. (RAN node 900 may be provided, for example, as discussed below with respect to network node 4160 of FIG. 16.) As shown, the RAN node may include transceiver circuitry 901 (also referred to as a transceiver, e.g., corresponding to portions of interface 4190 of FIG. 16) including a transmitter and a receiver configured to provide uplink and downlink radio communications with mobile terminals. The RAN node may include network interface circuitry 907 (also referred to as a network interface, e.g., corresponding to portions of interface 4190 of FIG. 16) configured to provide communications with other nodes (e.g., with other base stations) of the RAN and/or core network CN. The network node may also include processing circuitry 903 (also referred to as a processor, e.g., corresponding to processing circuitry 4170) coupled to the transceiver circuitry, and memory circuitry 905 (also referred to as memory, e.g., corresponding to device readable medium 4180 of FIG. 16) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 907, and/or transceiver 901. For example, processing circuitry 903 may control transceiver 901 to transmit downlink communications through transceiver 901 over a radio interface to one or more mobile terminals or mobile UEs and/or to receive uplink communications through transceiver 901 from one or more mobile terminals or mobile UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 9:
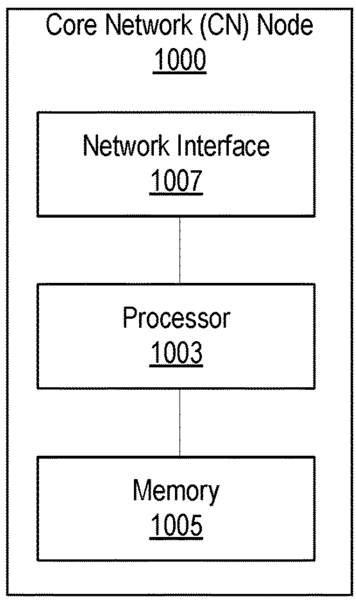
FIG. 9 is a block diagram illustrating a CN ("CN") node according to some embodiments of inventive concepts.

FIG. 9 is a block diagram illustrating elements of a core network CN node (e.g., an SMF node, an AMF node, etc.) of a communication network configured to provide cellular communication according to embodiments of inventive concepts. As shown, the CN node may include network interface circuitry 1007 (also referred to as a network interface) configured to provide communications with other nodes of the core network and/or the radio access network RAN. The CN node may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to core network nodes).

Overview of some proposed solutions addressing one or more of the above described problems:

Some embodiments of the present disclosure are directed to using various operational schemes for dividing the UE's QoE measurement capacity between multiple applications and/or multiple application data flows. The operations may include time sharing, which may be strict, configured time sharing, or opportunistic time sharing, based on actual application or data flow activity. Prioritization between QoE measurements on different applications and/or data flows is another approach, which in practice would be combined with opportunistic time sharing.

Furthermore, some embodiments use operational schemes for dealing with reporting of QoE measurement results pertaining to QoE measurements performed on multiple (e.g. in parallel ongoing) applications and/or data flows.

Some embodiments use a description of how the UE's support (or lack of support) for simultaneous QoE measurements on multiple parallel applications and/or data flows which is signalled to the network using capability signaling. A UE indicating lack of support for simultaneous QoE measurements on multiple parallel applications and/or data flows may further indicate which of the methods in the solution it supports.

Potential advantages that may be provided by one or more of these or other embodiments of the present disclose can include providing efficient and well-structured ways for a UE, which does not support simultaneous QoE measurements on multiple parallel applications and/or data flows, to still operate to handle QoE measurements on multiple parallel applications and/or data flows using various schemes for sharing of the UE's QoE measurement capacity between the different applications and/or data flows.

Various alternative or combinable operational sets of embodiments are now described below.

FIGS. 10 and 11 illustrate flowcharts of operations that are performed by a UE any network node, respectively, in accordance with some embodiments. Referring to FIG. 10, operations by a UE in a wireless communication network, include obtaining 1000 time sharing configuration for QoE measurements, and performing 1002 QoE measurements time divided between multiple applications and/or multiple application data flows processed by the UE. The QoE measurements are time divided based on the time sharing configuration.

Referring now to FIG. 11, operations by the network node in the wireless communication network, include generating 1100 a time sharing configuration defining time divided QoE measurements to be performed by a UE for multiple applications and/or multiple application data flows processed by the UE, and providing 1102 the time sharing configuration to the UE.

In at least some embodiments, the UE is not capable of performing simultaneous QoE measurements on the multiple applications and/or multiple application data flows processed by the UE without use of the time sharing configuration.

Embodiment Set 1: Time Sharing Between Applications and/or Application Data Flows Strict/Configured Time Sharing:

With this embodiment, the network configures the UE to use time sharing between QoE measurements on the different applications to be measured. The network can configure different duty cycles, e.g. depending on how critical the QoE is deemed to be for the respective applications, or depending on the typical or expected intensity of the traffic for the respective applications (e.g. in terms of data rates or amounts of data). For instance, if the UE is configured to perform QoE measurements on applications X and Y, the network could configure a duty cycle where the UE takes turn on measuring on application X and application Y with equally long time periods for both applications. As another example, again assuming that the UE is configured to perform QoE measurements on applications X and Y, the network may configure the UE to measure on application X two thirds of the time and on application Y one third of the time (e.g. a time period T with QoE measurements on application Y, followed by a time period 2T with QoE measurements on application X, in a repetitive cycle). In this example, the reason for configuring longer QoE measurement time periods for application X than for application Y could for instance be that the QoE is more critical for application X than for application Y (i.e. application X is more QoE sensitive than application Y) or that application X typically has more intensive traffic than application Y or that application X needs more measurements to gain a robust understanding of its performance status.

In another embodiment of this method the QoE measurements are given a time duration, e.g. a logging duration, and the UE is configured with percentages of time for each application, e.g. application X may be associated to 60% of the logging duration, while application Y to 40%.

Time sharing between QoE measurements may also be performed between different application data flows pertaining to, or associated with, the same application. Some applications communicate using multiple data flows, e.g. one data flow for each media component. In such a case, time sharing of QoE measurements may be performed between different data flows of the same application. Also in this case, an option could be that the network can configure not only that the UE should perform such time sharing, but also the time sharing duty cycle to use between the data flows. If two or more applications should be measured, and each of the applications has multiple data flows (or one of the applications has multiple data flows while another of the applications has a single data flow), the time sharing may be configured for the QoE measurements on the data flows across the applications. Another way to achieve a similar result is to configure time sharing in two tiers. A first tier with time sharing between the applications to be measured on and a second tier indicating how the QoE measurement time devoted to an application should be divided among the application's data flows.

An extension of this scheme could be that the RAN node may configure different duty cycles for QoE measurements of different applications or data flows based on aspects pertaining radio resources, such as downlink and uplink coverage, load measurements etc. The reason for doing this might be to assess QoE of different applications with different paces depending on the expected needs of the applications (e.g. based on coverage). As an example, an operator may want to monitor more closely the QoE for an application X which is highly demanding in terms of data rate or latency in a region where the pathloss measured by the UE is in a range between a minimum (e.g. Pathloss_X_min) and a maximum (e.g. Pathloss_X_max). In the same region, i.e. within the same pathloss range, the coverage level is deemed very good for another less demanding application Y that may run in parallel at the UE and the wanted QoE reporting for application Y can be relaxed. The pathloss range where more frequent QoE reports are wanted for application Y may be comprised e.g. between a minimum and maximum pathloss independent from the thresholds set for application X (say e.g. Pathloss_Y_min and Pathloss_Y_max) and the UE may be reconfigured to a different duty cycle when the pathloss measured by the UE is within that range.

Another extension of this scheme could be that a RAN node may configure different duty cycles for QoE measurements of different applications or data flows based on the UE being configured in dual connectivity (e.g. EN-DC or NR-DC) or not and, within the dual connectivity case, further differentiation may be done depending on the bearer configuration (e.g. MN or SN terminated, MCG or SCG or split bearer).

For EN-DC scenario, an example of how this may be done is the following: a UE in EN-DC configuration has initially one service active, say e.g. streaming. The UE can use both the MN leg and the SN leg or only one of them for data sending/receiving. The QoE measurement is configured for streaming and the UE has no problem with respect to concurrent QoE measurements (only one service is active at this time). Later, a speech call is initiated, and the RAN configures the bearers so that UE will have VoLTE as MN terminated bearer and streaming as SN terminated split bearer. Now the RAN wants the UE to measure QoE for both services, but the UE can only afford one QoE measurements at a time. The duty cycle may then be configured to reflect the fact that the UE has to send/receive some packets via the eNB for an ongoing speech call with certain constraints (e.g. maintaining a packet delay budget) and at the same time it may send/receive the packets related to the streaming service via the gNB. If it is assumed that voice is the most critical application between the two in terms of QoE sensitivity, the duty cycle may adapt to the voice service requirements (this may be relevant e.g. for QoE reporting, where it may be good to send the report interleaved with the voice packets).

In the NR-DC case, in one scenario the two NR cells may both operate in FR1 or in a second scenario one NR cell operates in FR1 and the second NR cell operates in FR2, which may lead to significant difference in available bandwidth between the two scenarios (hence the expected time to deliver a content in downlink can differ quite substantially). In this case, the duty cycle can be adjusted accordingly. In another embodiment of this method the time sharing scheme may be configured at the UE for a given set of applications. The UE may then move between areas of the network where not all applications are available. For example, the UE may move into areas where certain network slices are not supported and with that lack of support for certain services is encountered. In general, there could be areas where the UE moves and where only a portion of the applications for which the time sharing scheme has been configured are supported.

In this case, a number of mechanisms could be configured at the UE to control the way applications share the measurement duration. Three example embodiments are described below.

In a first embodiment, if the UE becomes aware that certain applications for which QoE measurements have been configured are not available in the serving area, the UE divides the measurement time associated with such applications equally between all other applications for which QoE measurements should be performed.

In a second embodiment, if the UE becomes aware that certain applications for which QoE measurements have been configured are not available in the serving area, the UE divides the measurement time associated with such applications between all other applications for which QoE measurements should be performed, according to the same relative proportional (possibly uneven) division of the time between the applications according to the overall configured time sharing between the applications.

In a third embodiment, further configuration is provided to the UE to specify the application(s) that takes any available measurement time duration, in case the UE becomes aware that certain applications for which QoE measurements have been configured are not available in the serving area. There might be more than one application to which the extra measurement time may be associated, in which case the extra measurement time may be equally shared amongst the specific applications or it may be shared according to a specific configuration describing in what percentages each specific application would be assigned portions of the extra available measurement time, e.g. in line with the overall, possibly uneven, configured time sharing between the applications (i.e. using similar relative division of the time).

In another embodiment, the RAN may configure the UE with QoE measurement configurations for multiple applications, independently of whether the UE has the capabilities of measuring multiple QoEs of multiple applications in parallel.

The embodiment entails that, if the UE does not have the capability of measuring in parallel multiple QoEs, the UE would derive multiple configurations from the one signaled by the RAN, where each configuration implies collecting measurements on a single application out of the multiple ones configured. The UE will therefore measure for a specific measurement duration, which might coincide with the measurement duration configured by the RAN for multiple application measurements, a single application. It will then log its measurements and it will report the log containing the application measurements to the RAN. After this process, the UE will start QoE measurements for the next application in the list of the multiple applications for which QoE measurements need to be performed. The QoE measurements will again be performed for a certain measurement duration and the results will be logged and reported to the RAN.

This embodiment therefore allows a UE not capable of performing multiple QoE measurements in parallel, to still be configured for QoE measurements on multiple applications, but to measure the applications one at the time and to report the logged measurements individually on a per application basis.

As an alternative, the UE may merge all the measurements for all measured applications in one log file and report them to the network at once, or in multiple logs.

A broader more general description of these and related embodiments is now described with further reference to FIGS. 10 and 11.

Referring to FIG. 10, the operations by the UE to perform 1002 QoE measurements time divided between the multiple applications and/or the multiple application data flows processed by the UE, may include repetitively cycling between performing QoE measurements on each of the multiple applications and/or multiple application data flows with timing of the cycling between performing the QoE measurements controlled by the time sharing configuration.

The timing of the cycling between performing the QoE measurements may be controlled based on a duty cycle defined by the time sharing configuration.

In a further embodiment, at least two of the multiple applications and/or multiple application data flows have different duty cycles defined by the time sharing configuration which are based on at least one of: importance of the QoE measurements for the respective application and/or application data flow; expected intensity of traffic for the respective application and/or application data flow; radio resources available for transmission and/or reception by the UE; radio resources used by the UE for transmission and/or reception; and wireless communication pathloss measured by the UE.

In a further embodiment, the timing of the cycling between performing the QoE measurements is controlled based on at least one of: whether the UE is configured in dual connectivity; a type of dual connectivity the UE is configured to use; a DRX cycle configuration in connected mode of the UE; and battery consumption of the UE.

Referring to FIG. 11, the operations by the network node to generate 1100 the time sharing configuration, may include defining a duty cycle at which the UE is to repetitively cycle between performing QoE measurements on each of the multiple applications and/or multiple application data flows.

The generating 1100 of the time sharing configuration, may include for each of at least two of the multiple applications and/or multiple application data flows, define the duty cycle for the application and/or application data flow based on at least one of: importance of the QoE measurements for the respective application and/or application data flow; expected intensity of traffic for the respective application and/or application data flow; radio resources available for transmission and/or reception by the UE; radio resources used by the UE for transmission and/or reception; and wireless communication pathloss measured by the UE.

The generating 1100 of the time sharing configuration may include for each of at least two of the multiple applications and/or multiple application data flows, define the duty cycle for the application and/or application data flow based on at least one of: whether the UE is configured in dual connectivity; a type of dual connectivity the UE is configured to use; a DRX cycle configuration in connected mode of the UE; and battery consumption of the UE.

Opportunistic Time Sharing:

The UE may be configured to autonomously perform opportunistic time sharing between QoE measurements on different applications. This method would leverage the fact that applications often generate bursty communication with possibly longer times between the packet bursts than during packet bursts. This intermittent communication can be leveraged for opportunistic time sharing, such that the UE performs measurements on the application that is currently actively communicating. When conflicts occur due to simultaneous data bursts in different applications, this may be dealt with as described below regarding the Embodiment set 2 having prioritization between applications or application data flows and the Embodiment set 3 having combined (opportunistic) time sharing and prioritization between applications or application data flows.

An extension of the opportunistic time sharing between QoE measurements on different application may be based on additional aspects that may be considered separately or in conjunction with the activity of a specific application, wherein this additional aspect would impact which application or data flow the UE chooses to perform QoE measurements on at any given time. Example of such additional aspects may be the radio coverage, the used RAT, the use of dual connectivity, the type of dual connectivity, DRX cycle configuration in connected mode, battery consumption.

A broader more general description of these and related embodiments is now described with further reference to FIGS. 10 and 11.

Referring to FIG. 10, the operations by the UE to perform 1002 QoE measurements time divided between the multiple applications and/or the multiple application data flows processed by the UE, may include performing opportunistic time sharing between the QoE measurements on the multiple applications and/or multiple application data flows processed by the UE, where the opportunistic time sharing between the QoE measurements includes performing the QoE measurements on the one of the multiple applications and/or multiple application data flows that is currently actively communicating through the wireless communication network.

FIG. 12 is a flowchart of some further operations by the UE in accordance to some embodiments of the present disclosure. Referring to FIG. 12, the UE is configured to perform (1200) opportunistic time sharing between the QoE measurements on the multiple applications and/or multiple application data flows processed by the UE.

Referring to FIG. 11, the operations by the network node to generate 1100 the time sharing configuration, may include providing an indication that the UE is to perform opportunistic time sharing between the QoE measurements on the multiple applications and/or multiple application data flows processed by the UE, where the opportunistic time sharing between the QoE measurements includes performing the QoE measurements on the one of the multiple applications and/or multiple application data flows that is currently actively communicating through the wireless communication network.

Hybrid of Strict/Configured Time Sharing and Opportunistic Time Sharing:

The network can configure time sharing of QoE measurements between different applications or data flows (e.g. in a specific cycle) and this may be combined with at least some opportunistic time sharing as follows. If a UE detects that during a time period devoted to QoE measurements on a certain application or data flow, this application or data flow is not currently active, i.e. no data is communicated at that particular time, the UE may instead use this time for QoE measurements on another application or data flow for which data is actively flowing. Which other application(s) or data flow(s) to choose may be based on configured priorities (see the Embodiment set 2 having prioritization between applications or application data flows). Alternatively, the UE may choose to measure on the application or data flow for which the preceding time period was devoted (provided that this application or data flow has active communication ongoing), e.g. if the lack of active communication is detected in the beginning of the time period devoted for the application or data flow. As another alternative, the UE may choose to measure on the application or data flow for which the subsequent time period is devoted (provided that this application or data flow has active communication ongoing), e.g. if the lack of active communication is detected later in the time period, e.g. in the second half of the time period, devoted for the application or data flow.

Referring again to FIG. 12, the UE determines 1202 that during a time period when a QoE measurement is to be performed on one of the multiple applications and/or multiple application data flows, that the one of the one of the multiple applications and/or multiple application data flows is not actively communicating with the wireless communication network. Responsive to the determination 1202, the UE performs 1204 during a remaining portion of the time period a QoE measurement on at least one other one of the multiple applications and/or multiple application data flows processed by the UE.

Another way to combine strict/configured time sharing and opportunistic time sharing could be to configure time sharing between QoE measurements on multiple applications, but if an application to be measured has multiple data flows, opportunistic time sharing may be used among the application's data flows. The opposite is also possible—opportunistic time sharing between applications, with strict time sharing between the flows of an application.

Another way to combine strict and opportunistic time sharing would be to strictly dedicate a certain percentage of time within a cycle to each of the involved applications (or flows within an application) and to allocate the remaining time within a cycle for opportunistic time sharing between these applications, where the "competitors" could be all or some data flows from each application.

Yet another way to combine strict and opportunistic time sharing would be to strictly dedicate a certain percentage of time within a cycle to each of the involved applications (or flows within an application), but to leave to the UE to opportunistically choose how to allocate the different dedicated time fractions (i.e. the percentages of the cycle) within the cycle, as long as the UE adheres to the dedicated percentage division.

Embodiment Set 2: Prioritization Between Applications or Application Data Flows With this embodiment set, the UE is configured to always prioritize measurements on simultaneously ongoing applications according to a certain priority order. This means that whenever data is actively flowing (uplink and/or downlink between the UE and the wireless communication network) for two or more applications at the same time, the UE only collects measurements pertaining to the application with the highest priority (among the concerned applications). A similar prioritization could be more granular, if applied per application data flow rather than per application. With this variation, the UE would prioritize the application data flow with the highest priority of a number of simultaneously active application data flows. This may result in prioritization between data flows pertaining to the same application, e.g. different data flows for different media components, or between applications. The former (i.e. prioritization between data flows pertaining to the same application) may be relevant if the UE can only perform QoE measurements on one data flow at a time (e.g. one media component) even if the data flows pertain to the same application.

An example of prioritization between data flows of different applications may e.g. be that application X has data flows X1 and X2 while application Y has data flow Y1. The priority order may be configured to be (from the highest to the lowest priority) X1, Y1, X2, meaning that the UE would prioritize the two data flows of application X differently compared to the data flow of application Y, i.e. QoE measurements on data flow X1 would have precedence over QoE measurements on data flow Y1, while QoE measurements on data flow Y1 would have precedence over QoE measurements on data flow X2.

FIG. 13 is a flowchart of operations by the UE to perform QoE measurements according to a priority order defined based on the time sharing configuration. Referring to FIGS. 10 and 13, when the UE is performing 1002 QoE measurements time divided between the multiple applications and/or the multiple application data flows processed by the UE, the operations include performing prioritization 1300 of the QoE measurements on the multiple applications and/or multiple application data flows according to a priority order defined based on the time sharing configuration, when more than one of the multiple applications and/or multiple application data flows simultaneously have data actively flowing.

FIG. 14 is a flowchart of corresponding operations by the network node to control the UE to perform QoE measurements according to a priority order defined based on the time sharing configuration. Referring to FIGS. 11 and 14, when the network node is generating 1100 the time sharing configuration, the operations include providing 1400 an indication that the UE is to perform prioritization of the QoE measurements on the multiple applications and/or multiple application data flows according to a defined priority order, when more than one of the multiple applications and/or multiple application data flows simultaneously have data actively flowing.

An extension of this scheme could be that the priority configuration has a built-in fairness criterion, e.g. that if an application or a data flow is starved in the sense that a long time elapses without any QoE measurements being performed on the application or data flow, due to collisions with higher priority applications or data flows, then the priority of the starved application or data flow would be increased. Various more or less elaborated schemes for such fairness-based priority adaptation could be designed, e.g. inspired by a multitude of scheduling algorithms (including leaky-bucket-based approaches). Note that fairness-based priority adaptation may also involve that the priority of an application or data flow is decreased, e.g. in case it has received an unfair amount of QoE measurements (even unnecessarily many/frequent QoE measurements potentially resulting in that redundant or less useful measurement data might be reported (unless the UE is configured to filter out such unnecessary data to limit the amount of reported data)).

Thus, in a further embodiment, the UE may operate to adjust the priority order based on comparison of amount of data flows that have occurred for the multiple applications and/or multiple application data flows.

Another extension of this scheme could be that the priority to perform QoE measurements among applications or among data flows of different applications (e.g. pertaining to different media components) depends on the RAT used at a given time. As an example, for a UE served by E-UTRAN, it may happen that QoE measurements for two applications, e.g. streaming and voice are required, and the UE applies a prioritization in the QoE measurements between the two. Later on, the UE is transitioned to 3G via Single Radio Voice Call Continuity (SRVCC), and this results in the voice component being kept and the streaming component being interrupted, dropped or paused. One extension of the prioritization scheme may be that, as the inter-RAT mobility procedure takes place, the priority of the application or the priority of media components not used in the target RAT is decreased to a very low value or to a special value indicating to the UE to stop QoE measurements for that application or media component in the new RAT. The priority may be reversed (i.e. set to its original value) as the UE returns to the original RAT.

In one embodiment, the UE may have been configured by the network to autonomously perform this change of priority (and possibly other priority changes), based on the situation. For example, the UE may prioritize the measurements for applications/application data flows that are currently exhibiting, or have exhibited in recent past (e.g. in the previous QoE reports), a deterioration of the QoE. Such a principle may also be applied to the methods described above, e.g. opportunistic time sharing. Thus, in a further embodiment, the UE may operate to adjust the priority order based on comparison of the QoE measurements for the multiple applications and/or multiple application data flows.

In one embodiment, the UE may prioritize sending reports collected during a period where the radio conditions were bad. Reports collected when the radio conditions were good may be discarded by the UE.

In another embodiment, the UE prioritizes sending reports by the size. E.g. small reports may be discarded, whereas large reports are transmitted as they may contain data collected over a longer period of time.

One option for configuring the UE with different priorities for different applications could be to link different applications with different logical channels. The UE could then determine the priority of a certain application by checking the logical channel for the specific application.

Embodiment Set 3: Combined (Opportunistic) Time Sharing and Prioritization

When UE autonomous opportunistic time sharing is used/configured, and collisions between applications and/or data flows occur (i.e. when active data communication is ongoing simultaneously for different applications and/or data flows), these conflicts can be resolved using priority rules (where fairness-based adaptation of the priorities also could be applied).

Thus, in a further embodiment, the UE may operate to adjust the priority order based on identifying occurrence of timing collisions between occurrence of the multiple applications and/or multiple application data flows.

Embodiment Set 4: Applications with Multiple Data Flows, e.g. Different Media Components The details of how to deal with applications using multiple data flows are described in conjunction with other embodiment sets.

In general, one can say that some applications use multiple data flows, e.g. for different media components (or possibly a division of control signaling and "user/application" data flow). In such cases, the discussion around how to deal with QoE measurements on multiple simultaneous applications (when a UE lacks support for this, or only partially supports it) can be applied with finer granularity on application data flows rather than on applications. Various ways to do this are captured in the descriptions of the other embodiment sets.

Embodiment Set 5: Reporting of Multiple QoE Measurements

When a UE performs QoE measurements on multiple applications, simultaneously in parallel or using some of the previously described schemes for time sharing and/or prioritization, the UE also has to have a strategy, or principle, for how to report the results of the multiple QoE measurements to the network. This may be configured by the network or may be standardized and/or may to a large extent be left to UE implementation.

The UE may send either separate QoE measurement reports per application or a combined QoE measurement report containing the QoE measurement results for multiple applications. Using separate per-application reports for one or more applications while other applications are reported in one or more combined reports would also be possible. The choice may be standardized (i.e. only one of them is supported by the standard) or it could be configurable (i.e. the network configures whether the UE should send separate QoE measurement reports per application or combined QoE measurement reports containing the QoE measurement results for multiple applications or both, possibly depending on which applications the UE measures on).

Another option could be that the UE makes the choice itself. Such UE autonomous choices may also be a configurable optional behavior which the network may configure the UE to perform (e.g. as an option in addition to the options of separate reports and combined reports). If the network configures the UE to perform autonomous choices of QoE measurement report method, the network may provide rules or guidelines (making the choice semi-autonomous), e.g. stating that a combined report should be used if QoE measurement data suitable for reporting becomes available for multiple applications within a configurable time period, but if the reporting of QoE measurement results for one application would be too much delayed (e.g. exceeding a configurable time period), the QoE measurement results already available for reporting for one (or more) application(s) should be sent in a separate (or combined) QoE measurement report rather than waiting for QoE measurement results pertaining to another application so that a combined QoE measurement report can be sent.

Another option is a combination of autonomous and configured reporting for multiple applications. Herein, the network can configure the UE to allocate a fixed amount of resources for sending the QoE reports of each measured application, and a fraction of reporting resources is left for the UE to autonomously allocate for sending the reports of the application(s) it chooses. The choice criteria can be the same as the criteria defined above for executing the measurements, as well as a number of criteria defined specifically for reporting.

FIG. 15 illustrates a flowchart of operations that can be performed by a UE to report the QoE measurements to a network node in accordance with some embodiments. Referring to FIG. 15, the UE sends 1500 indications of the QoE measurements to the network node. In one embodiment, the UE sends 1502 separate measurement reports for each of the multiple applications and/or multiple application data flows. Alternatively or additionally for at least some of the applications and/or application data flows, the UE combines 1504 the QoE measurements for all of the multiple applications and/or multiple application data flows into a log file, and sends 1506 the log file to the network node.

Embodiment Set 6: Capability Signaling

Capability signaling from the UE to the network may be used to inform the network of the UE's support or lack of support for simultaneous QoE measurements on multiple applications. Such capability signaling could also be used to allow the UE to inform the network which of the features/methods described herein that the UE supports.

The UE may indicate support of lack of support for simultaneous QoE measurements (or for the methods described herein), but it is also conceivable that the UE indicates partial support, e.g. that it is capable of performing simultaneous QoE measurements on certain combination(s) of applications or that it is capable of performing simultaneous QoE measurements on multiple data flows provided that they pertain to the same application.

Such capability information would preferably be signaled to the network in the UECapabilityInformation RRC message in response to a UECapabilityEnquiry message from the network but using other messages (e.g. a new request/response RRC message pair) would also be conceivable.

Thus, in one embodiment the UE further operates to generate an indication of the UE's lack of support for simultaneous QoE measurements on multiple applications and/or multiple application data flows, and provides the indication to a network node, wherein the time sharing configuration is received from the network node. In a related embodiment, the network node correspondingly receives from the UE an indication of the UE's lack of support for simultaneous QoE measurements on multiple applications and/or multiple application data flows, wherein the providing the time sharing configuration to the UE is responsive to the indication received from the UE.

Example Implementation

The multi-service or application measurement policy can be configured by the network when sending the QoE measurement configuration of multiple services to the UE. An example implementation of the method is shown highlighted below.

```
MeasConfigAppLayer-r16 ::= SEQUENCE {
  measConfigAppLayerContainer-r15   OCTET STRING (SIZE(1..1000))
    OPTIONAL, -- Need ON
  serviceType-r16 ServiceType-r16   OPTIONAL,       -- Need ON
  qoe-Reference-r16 QoE-Reference-r16 OPTIONAL, -- Need ON
  withinArea-r16 ENUMERATED {inside, outside} OPTIONAL, -- Need
  ON
  temporaryStopQoE-r16        BOOLEAN,
  restartQoE-r16              BOOLEAN,
  multiApp-Meas-Policy   ENUMERATED {timesharing, opportunistic,
hybridtimesharing-opportunistic, priority, autonomous, all}
  multiApp-Reporting-Policy   ENUMERATED {timesharing,
opportunistic, hybridtimesharing-opportunistic, priority, autonomous, all}
  multiApp-Report-Combining-Policy   ENUMERATED {activated, not
  activated}
}
MeasReleaseAppLayer-r16 ::= SEQUENCE {
  serviceType-r16 ServiceType-r16   OPTIONAL, -- Need ON
  qoe-Reference-r16 QoE-Reference-r16 OPTIONAL -- Need ON
}
```

Alternatively, the above multiApp-Meas-Policy, multiApp-Reporting-Policy, and multiApp-Report-Combining-Policy can be in the form of a binary string of the length equal to the number of codepoints above (e.g. a bitmap), where the value "0"=not supported and "1"=supported.

In order to achieve the objective, i.e. to ensure that the application layer is aware of the policy for simultaneous measurements, the UE may use an AT command to send the measurement policy to the applications. A relevant AT command is enhanced with means to indicate the measurement policy the network or the UE has selected. An example implementation of the method is shown in the above multiApp-Meas-Policy, multiApp-Reporting-Policy, and multiApp-Report-Combining-Policy and below by the command use of <MultiApp policy>.

Application level measurement configuration +CAPPLEVMC, illustrated in the table below for +CAPPLEVMC parameter command syntax.

| Command | Possible response(s) |
|---|---|
| +CAPPLEVMC=[<n>] | +CME ERROR: <err> |
| +CAPPLEVMC? | +CAPPLEVMC: <n> |
| +CAPPLEVMC=? | +CAPPLEVMC: (list of supported <n>s) |

Description

This command allows control of the application level measurement configuration according to 3GPP TS 25.331 and 3GPP TS 36.331. The set command controls the presentation of the unsolicited result code +CAPPLEVMC: <app-meas_service_type>, <start-stop_reporting>, <MultiApp policy>, [, <app-meas_config_file_length>, <app-meas_config-file>] providing data for the configuration. Refer subclause 9.2 for possible <err> values.

Read command returns the current value of <n>.

Test command returns values supported as a compound value.

Defined Values

<n>: integer type. Disable and enable presentation of the unsolicited result code+CAPPLEVMC to the TE.

0 Disable presentation of the unsolicited result code

1 Enable presentation of the unsolicited result code

<app-meas_service_type>: integer type. Contains the indication of what application that is target for the application level measurement configuration.

Editor's Note: The coding of the <app-meas_service type> is FFS.

<start-stop_reporting>: integer type. Indicates the start and stop of the application level measurement reporting for the application indicated by the <app-meas_service_type>.

0 start the application level measurement reporting 1 stop the application level measurement reporting <MultiApp policy>: integer type. Indicates to the application the measurement policy when multiple applications are configured to perform measurements possibly concurrently/simultaneously <app-meas_service_type>.

0 policy 0; indicating a particular policy e.g., time sharing 1 policy 1; indicating a particular policy e.g., opportunistic time sharing 2 policy 2; indicating a particular policy e.g., Hybrid of strict/configured time sharing and opportunistic 3 policy 3; indicating a particular policy e.g., priority approach 4 policy 4; indicating a particular policy e.g., autonomous approach 5 policy 5; indicating a particular policy e.g., all approaches

. . . .

N policy N; indicating a particular policy

<app-meas_config_file_length>: integer type. Indicates the number of octets of the <app-meas_config-file> parameter.

<app-meas_config-file>: string of octets. Contains the application level measurement configuration file for the application indicated by the <app-meas_service_type>. The parameter shall not be subject to conventional character conversion as per +CSCS.

Operational Summary of these Embodiments

Operations, methods, and computer program products are provided for a UE, which is incapable of performing simultaneous QoE measurements on multiple applications or multiple data flows, to overcome this lack of capability. The embodiments can include dividing the UE's QoE measurement capacity between multiple applications and/or multiple application data flows.

As one main optional aspect of these embodiments, the network configures the UE with strict time sharing between QoE measurements on the concerned applications or data flows. This may involve a duty cycle with specific time periods devoted to measurements on each of the concerned applications or data flows in a repetitive cycle.

As another main optional aspect of these embodiments, the network configures the UE to perform opportunistic time sharing between QoE measurements on the concerned parallel applications or data flows, i.e. measuring on the application or data flow that is currently actively communicating.

As another main optional aspect of these embodiments, the UE is configured to perform prioritization of the QoE measurements on the different applications or data flows, according to a configured priority order, when more than one of the parallel applications or data flows simultaneously have data (to be potentially be measured on) actively flowing. These operations may preferably be combined with the opportunistic time sharing method.

As another main optional aspect of these embodiments, the above main aspects may be combined in a hybrid solution, where different ways of combining strict time sharing, opportunistic time sharing and prioritization are applied to produce an efficient time sharing of the UE's QoE measurement capacity between the parallel applications or data flows to be measured on.

In these and other main aspects of these embodiments, the network can operate to provide the UE with the configuration and the UE can operate to perform the QoE measurements in accordance with the configuration. Note that it is also possible that some of the configurations, or partial configurations, may optionally be standardized and would then not be dynamically signaled from the network to the UE.

As yet another aspect of these embodiments, strategies or principles for reporting of QoE measurement results pertaining to different applications or data flows are provided.

As yet another aspect of these embodiments, capability signaling is described as a means for a UE to inform the network of the UE's support or lack of support for simultaneous QoE measurements on multiple applications and/or data flows. If lack of support for simultaneous QoE measurements on multiple parallel applications and/or data flow is indicated, the UE may further indicate which of the aspects of the solution the UE supports.

Example embodiments are discussed below.

Embodiment 1. A method of operating a user equipment, UE, in a wireless communication network, the method comprising:

obtaining (1000) time sharing configuration for quality of experience, QoE, measurements; and performing (1002) QoE measurements time divided between multiple applications and/or multiple application data flows processed by the UE, where the QoE measurements are time divided based on the time sharing configuration.

Embodiment 2. The method of Embodiment 1, wherein the obtaining time sharing configuration for QoE measurements, comprises:

receiving the time sharing configuration from a network node.

Embodiment 3. The method of any of Embodiments 1 to 2, wherein the UE is not capable of performing simultaneous QoE measurements on the multiple applications and/or multiple application data flows processed by the UE without use of the time sharing configuration.

Embodiment 4. The method of any of Embodiments 1 to 3, wherein the performing (1002) QoE measurements time divided between the multiple applications and/or the multiple application data flows processed by the UE, comprises:

repetitively cycling between performing QoE measurements on each of the multiple applications and/or multiple application data flows with timing of the cycling between performing the QoE measurements controlled by the time sharing configuration.

Embodiment 5. The method of Embodiment 4, wherein the timing of the cycling between performing the QoE measurements is controlled based on a duty cycle defined by the time sharing configuration.

Embodiment 6. The method of Embodiment 5, wherein at least two of the multiple applications and/or multiple application data flows have different duty cycles defined by the time sharing configuration which are based on at least one of: importance of the QoE measurements for the respective application and/or application data flow; expected intensity of traffic for the respective application and/or application data flow; radio resources available for transmission and/or reception by the UE; radio resources used by the UE for transmission and/or reception; and wireless communication pathloss measured by the UE.

Embodiment 7. The method of any of Embodiments 4 to 7, wherein the timing of the cycling between performing the QoE measurements is controlled based on at least one of: whether the UE is configured in dual connectivity; a type of dual connectivity the UE is configured to use; a DRX cycle configuration in connected mode of the UE, and battery consumption of the UE.

Embodiment 8. The method of any of Embodiments 4 to 7, further comprising:

determining (1202) that during a time period when a QoE measurement is to be performed on one of the multiple applications and/or multiple application data flows, that the one of the one of the multiple applications and/or multiple application data flows is not actively communicating with the wireless communication network; and responsive to the determination (1202), performing (1204) during a remaining portion of the time period a QoE measurement on at least one other one of the multiple applications and/or multiple application data flows processed by the UE.

Embodiment 9. The method of any of Embodiments 1 to 7, wherein the performing (1002) QoE measurements time divided between the multiple applications and/or the multiple application data flows processed by the UE, comprises:

performing (1200) opportunistic time sharing between the QoE measurements on the multiple applications and/or multiple application data flows processed by the UE, wherein the opportunistic time sharing between the QoE measurements includes performing the QoE measurements on the one of the multiple applications and/or multiple application data flows that is currently actively communicating through the wireless communication network.

Embodiment 10. The method of any of Embodiments 1 to 9, wherein the performing (1002) QoE measurements time divided between the multiple applications and/or the multiple application data flows processed by the UE, comprises:

performing (1300) prioritization of the QoE measurements on the multiple applications and/or multiple application data flows according to a priority order defined based on the time sharing configuration, when more than one of the multiple applications and/or multiple application data flows simultaneously have data actively flowing.

Embodiment 11. The method of Embodiment 10, further comprising:

adjusting the priority order based on comparison of amount of data flows that have occurred for the multiple applications and/or multiple application data flows.

Embodiment 12. The method of Embodiment 10, further comprising:

adjusting the priority order based on comparison of the QoE measurements for the multiple applications and/or multiple application data flows.

Embodiment 13. The method of Embodiment 10, further comprising:

adjusting the priority order based on identifying occurrence of timing collisions between occurrence of the multiple applications and/or multiple application data flows.

Embodiment 14. The method of any of Embodiments 1 to 13, further comprising:

generating an indication of the UE's lack of support for simultaneous QoE measurements on multiple applications and/or multiple application data flows; and providing the indication to a network node, wherein the time sharing configuration is received from the network node.

Embodiment 15. The method of any of Embodiments 1 to 14, further comprising:

sending (1500) indications of the QoE measurements to a network node.

Embodiment 16. The method of Embodiment 15, wherein the sending (1500) indications of the QoE measurements to the network node comprises:

sending (1502) separate measurement reports for each of the multiple applications and/or multiple application data flows.

Embodiment 17. The method of Embodiment 15, wherein the sending (1500) indications of the QoE measurements to the network node comprises:

combining (1504) the QoE measurements for all of the multiple applications and/or multiple application data flows into a log file; and sending (1506) the log file to the network node.

Embodiment 18. A method of operating a network node in a wireless communication network, the method comprising:

generating (1100) a time sharing configuration defining time divided quality of experience, QoE, measurements to be performed by a user equipment, UE, for multiple applications and/or multiple application data flows processed by the UE; and providing (1102) the time sharing configuration to the UE.

Embodiment 19. The method of Embodiment 18, wherein the generating (1100) of the time sharing configuration, comprises:

providing an indication that the UE is to perform opportunistic time sharing between the QoE measurements on the multiple applications and/or multiple application data flows processed by the UE, wherein the opportunistic time sharing between the QoE measurements includes performing the QoE measurements on the one of the multiple applications and/or multiple application data flows that is currently actively communicating through the wireless communication network.

Embodiment 20. The method of any of Embodiments 18 to 19, wherein the generating of the time sharing configuration, comprises:

providing (1400) to the UE an indication that the UE is to perform prioritization of the QoE measurements on the multiple applications and/or multiple application data flows according to a defined priority order, when more than one of the multiple applications and/or multiple application data flows simultaneously have data actively flowing.

Embodiment 21. The method of any of Embodiments 18 to 20, further comprising:

receiving from the UE an indication of the UE's lack of support for simultaneous QoE measurements on multiple applications and/or multiple application data flows, wherein the providing the time sharing configuration to the UE is responsive to the indication received from the UE.

Embodiment 22. The method of any of Embodiments 18 to 21, wherein the generating (1100) of the time sharing configuration, comprises:

defining a duty cycle at which the UE is to repetitively cycle between performing QoE measurements on each of the multiple applications and/or multiple application data flows.

Embodiment 23. The method of Embodiment 22, wherein the generating (1100) of the time sharing configuration, comprises:

for each of at least two of the multiple applications and/or multiple application data flows, define the duty cycle for the application and/or application data flow based on at least one of: importance of the QoE measurements for the respective application and/or application data flow; expected intensity of traffic for the respective application and/or application data flow; radio resources available for transmission and/or reception by the UE; radio resources used by the UE for transmission and/or reception; and wireless communication pathloss measured by the UE.

Embodiment 24. The method of Embodiment 22, wherein the generating (1100) of the time sharing configuration, comprises:

for each of at least two of the multiple applications and/or multiple application data flows, define the duty cycle for the application and/or application data flow based on at least one of: whether the UE is configured in dual connectivity; a type of dual connectivity the UE is configured to use; a DRX cycle configuration in connected mode of the UE, and battery consumption of the UE.

Embodiment 25. A user equipment, UE, (800) in a wireless communication network, the UE comprising:

processing circuitry (803); and memory (805) coupled to the processing circuitry and having instructions stored therein that are executable by the processing circuitry to cause the UE to perform operations comprising:

obtaining (1000) time sharing configuration for quality of experience, QoE, measurements; and performing (1002) QoE measurements time divided between multiple applications and/or multiple application data flows processed by the UE, where the QoE measurements are time divided based on the time sharing configuration.

Embodiment 26. The UE of Embodiment 25, wherein the operations further comprise any of the operations of Embodiments 2 to 17.

Embodiment 27. A user equipment, UE, (800) in a wireless communication network, the UE adapted to perform operations comprising:

obtaining (1000) time sharing configuration for quality of experience, QoE, measurements; and performing (1002) QoE measurements time divided between multiple applications and/or multiple application data flows processed by the UE, where the QoE measurements are time divided based on the time sharing configuration.

Embodiment 28. The UE of Embodiment 27, wherein the UE is further adapted to perform any of the operations of Embodiments 2 to 17.

Embodiment 29. A computer program comprising program code to be executed by processing circuitry (803) of a user equipment, UE, (800) operating in a wireless communication network, whereby execution of the program code causes the UE to perform operations, the operations comprising:

obtaining (1000) time sharing configuration for quality of experience, QoE, measurements; and performing (1002) QoE measurements time divided between multiple applications and/or multiple application data flows processed by the UE, where the QoE measurements are time divided based on the time sharing configuration.

Embodiment 30. The computer program of Embodiment 29, the operations further comprising any of the operations of claims 2 to 17.

Embodiment 31. A computer program product comprising a non-transitory storage medium including program code to be executed by processing circuitry (803) of a user equipment, UE, (800) operating in a wireless communication network, whereby execution of the program code causes the UE to perform operations, the operations comprising:

obtaining (1000) time sharing configuration for quality of experience, QoE, measurements; and performing (1002) QoE measurements time divided between multiple applications and/or multiple application data flows processed by the UE, where the QoE measurements are time divided based on the time sharing configuration.

Embodiment 32. The computer program product of Embodiment 31, the operations further comprising any of the operations of Embodiments 2 to 17.

Embodiment 33. A network node (900, 1000) in a wireless communication network, the network node comprising:

processing circuitry (903, 1003); and memory (905, 1005) coupled to the processing circuitry and having instructions stored therein that are executable by the processing circuitry to cause the network node to perform operations comprising:

generating (1100) a time sharing configuration defining time divided quality of experience, QoE, measurements to be performed by a user equipment, UE, for multiple applications and/or multiple application data flows processed by the UE; and providing (1102) the time sharing configuration to the UE.

Embodiment 34. The network node of Embodiment 33, the operations further comprising any of the operations of Embodiments 18 to 24.

Embodiment 35. A network node (900, 1000) in a wireless communication network, the network node adapted to perform operations comprising:

generating (1100) a time sharing configuration defining time divided quality of experience, QoE, measurements to be performed by a user equipment, UE, for multiple applications and/or multiple application data flows processed by the UE; and providing (1102) the time sharing configuration to the UE.

Embodiment 36. The network node of Embodiment 35, wherein the network node is further adapted to perform any of the operations of Embodiments 18 to 24.

Embodiment 37. A computer program comprising program code to be executed by processing circuitry (903, 1003) of a network node (900, 1000) operating in a wireless communication network, whereby execution of the program code causes the network node to perform operations, the operations comprising:

generating (1100) a time sharing configuration defining time divided quality of experience, QoE, measurements to be performed by a user equipment, UE, for multiple applications and/or multiple application data flows processed by the UE; and providing (1102) the time sharing configuration to the UE.

Embodiment 38. The computer program of Embodiment 37, the operations further comprising any of the operations of Embodiments 18 to 24.

Embodiment 39. A computer program product comprising a non-transitory storage medium including program code to be executed by processing circuitry (903, 1003) of a network node (900, 1000) operating in a wireless communication network, whereby execution of the program code causes the network node to perform operations, the operations comprising:

generating (1100) a time sharing configuration defining time divided quality of experience, QoE, measurements to be performed by a user equipment, UE, for multiple applications and/or multiple application data flows processed by the UE; and providing (1102) the time sharing configuration to the UE.

Embodiment 40. The computer program product of Embodiment 39, the operations further comprising any of the operations of Embodiments 18 to 24.

Various of the following abbreviations are used herein:

| Abbreviation | Explanation |
|---|---|
| 3G | 3rd Generation |
| 3GPP | 3rd Generation Partnership Project |
| 5GC | 5G Core |
| 5GCN | 5G Core Network |
| AMF | Access and Mobility Management Function |
| AR | Augmented Reality |
| AT | Attention |
| BAP | Backhaul Adaptation Protocol |
| CHO | Conditional Handover |
| CN | Core Network |

-continued

| Abbreviation | Explanation |
|---|---|
| CP | Control Plane |
| CU | Central Unit |
| DAPS | Dual Active Protocol Stacks |
| DC | Dual Connectivity |
| DN | Data Network |
| DRX | Discontinuous Reception |
| DU | Distributed Unit |
| eNB | E-UTRAN NodeB/Evolved NodeB |
| EN-DC | E-UTRA-NR Dual Connectivity |
| E-UTRA | Evolved UTRA |
| E-UTRAN | Evolved UTRAN |
| FFS | For Further Study |
| FR | Frequency Range |
| gNB | Radio base station in NR. |
| GPRS | General Packet Radio Service |
| GTP | GPRS Tunneling Protocol |
| ID | Identifier/Identity |
| IE | Information Element |
| IMS | IP Multimedia Subsystem |
| IP | Internet Protocol |
| I-UPF | Intermediate UPF |
| LTE | Long Term Evolution |
| LBT | Listen Before Talk |
| MCE | Measurement Collector Entity |
| MCG | Master Cell Group |
| MME | Mobility Management Entity |
| MN | Master Node |
| MR-DC | Multi-Radio Dual Connectivity |
| MTSI | Multimedia Telephony Service for IMS |
| NAI | Network Assistance Information |
| NE-DC | NR-E-UTRA Dual Connectivity |
| NF | Network Function |
| NG | Next Generation |
| NGEN-DC | NG-RAN E-UTRA-NR Dual Connectivity |
| NG-RAN | NG Radio Access Network |
| NR | New Radio |
| NR-DC | NR-NR Dual Connectivity |
| O&M | Operation and Maintenance |
| OAM | Operation and Maintenance |
| PDCCH | Physical Downlink Control Channel |
| PDCP | Packet Data Convergence Protocol |
| PDU | Protocol Data Unit |
| PLMN | Public Land Mobile Network |
| QoE | Quality of Experience |
| QoS | Quality of Service |
| RAN | Radio Access Network |
| RAT | Radio Access Technology |
| RRC | Radio Resource Control |
| S1 | The interface between two eNBs in LTE. |
| S1AP | S1 Application Protocol |
| SCG | Secondary Cell Group |
| SN | Secondary Node |
| SRB | Signaling Radio Bearer |
| SRVCC | Single Radio Voice Call Continuity |
| TCE | Trace Collector Entity |
| TSG | Technical Specification Group |
| UE | User Equipment |
| UMTS | Universal Mobile Telecommunication System |
| UP | User Plane |
| URLLC | Ultra-Reliable Low-Latency Communication |
| UTRA | Universal Terrestrial Radio Access |
| UTRAN | Universal Terrestrial Radio Access Network |
| VoLTE | Voice over LTE |
| VR | Virtual Reality |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as M IMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a user equipment (UE) in a wireless communication network, the method comprising:

obtaining time sharing configuration for quality of experience (QoE) measurements; and performing QoE measurements time divided between multiple applications and/or multiple application data flows processed by the UE, wherein the QoE measurements are time divided based on the time sharing configuration, the time sharing configuration specifying, for each of the multiple applications and/or multiple application data flows, a share of QoE measurement time.

2. The method of claim 1, wherein the obtaining time sharing configuration for QoE measurements, comprises:

receiving the time sharing configuration from a network node.

3. The method of claim 1, wherein the UE is not capable of performing simultaneous QoE measurements on the multiple applications and/or multiple application data flows processed by the UE without use of the time sharing configuration.

4. The method of claim 1, wherein the performing QoE measurements time divided between the multiple applications and/or the multiple application data flows processed by the UE, comprises:

repetitively cycling between performing QoE measurements on each of the multiple applications and/or multiple application data flows with timing of the cycling between performing the QoE measurements controlled by the time sharing configuration.

5. The method of claim 4, wherein the timing of the cycling between performing the QoE measurements is controlled based on a duty cycle defined by the time sharing configuration.

6. The method of claim 5, wherein at least two of the multiple applications and/or multiple application data flows have different duty cycles defined by the time sharing configuration which are based on at least one of: importance of the QoE measurements for the respective application and/or application data flow; expected intensity of traffic for the respective application and/or application data flow; radio resources available for transmission and/or reception by the UE; radio resources used by the UE for transmission and/or reception; and wireless communication pathloss measured by the UE.

7. The method of claim 4, wherein the timing of the cycling between performing the QoE measurements is controlled based on at least one of: whether the UE is configured in dual connectivity; a type of dual connectivity the UE is configured to use; a DRX cycle configuration in connected mode of the UE; and battery consumption of the UE.

8. The method of claim 4, further comprising:

determining that during a time period when a QoE measurement is to be performed on one of the multiple applications and/or multiple application data flows, that the one of the multiple applications and/or multiple application data flows is not actively communicating with the wireless communication network; and responsive to the determination, performing during a remaining portion of the time period a QoE measurement on at least one other of the multiple applications and/or multiple application data flows processed by the UE.

9. The method of claim 1, wherein the performing QoE measurements time divided between the multiple applications and/or the multiple application data flows processed by the UE, comprises:

performing opportunistic time sharing between the QoE measurements on the multiple applications and/or multiple application data flows processed by the UE, wherein the opportunistic time sharing between the QoE measurements includes performing the QoE measurements on the one of the multiple applications and/or multiple application data flows that is currently actively communicating through the wireless communication network.

10. The method of claim 1, wherein the performing QoE measurements time divided between the multiple applications and/or the multiple application data flows processed by the UE, comprises:

performing prioritization of the QoE measurements on the multiple applications and/or multiple application data flows according to a priority order defined based on the time sharing configuration, when more than one of the multiple applications and/or multiple application data flows simultaneously have data actively flowing.

11. The method of claim 10, further comprising:

adjusting the priority order based on comparison of amount of data flows that have occurred for the multiple applications and/or multiple application data flows.

12. The method of claim 10, further comprising:

adjusting the priority order based on comparison of the QoE measurements for the multiple applications and/or multiple application data flows.

13. The method of claim 10, further comprising:

adjusting the priority order based on identifying occurrence of timing collisions between occurrence of the multiple applications and/or multiple application data flows.

14. The method of claim 1, further comprising:

generating an indication of the UE's lack of support for simultaneous QoE measurements on multiple applications and/or multiple application data flows; and providing the indication to a network node, wherein the time sharing configuration is received from the network node.

15. The method of claim 1, further comprising:

sending indications of the QoE measurements to a network node.

16. The method of claim 15, wherein the sending indications of the QoE measurements to the network node comprises:

sending separate measurement reports for each of the multiple applications and/or multiple application data flows.

17. The method of claim 15, wherein the sending indications of the QoE measurements to the network node comprises:

combining the QoE measurements for all of the multiple applications and/or multiple application data flows into a log file; and sending the log file to the network node.

18. A method of operating a network node in a wireless communication network, the method comprising:

generating a time sharing configuration defining time divided quality of experience (QoE) measurements to be performed by a user equipment (UE) for multiple applications and/or multiple application data flows processed by the UE, the time sharing configuration specifying, for each of the multiple applications and/or multiple application data flows, a share of QoE measurement time; and providing the time sharing configuration to the UE.

19. The method of claim 18, wherein the generating of the time sharing configuration, comprises:

providing an indication that the UE is to perform opportunistic time sharing between the QoE measurements on the multiple applications and/or multiple application data flows processed by the UE, wherein the opportunistic time sharing between the QoE measurements includes performing the QoE measurements on the one of the multiple applications and/or multiple application data flows that is currently actively communicating through the wireless communication network.

20. The method of claim 18, wherein the generating of the time sharing configuration, comprises:

providing to the UE an indication that the UE is to perform prioritization of the QoE measurements on the multiple applications and/or multiple application data flows according to a defined priority order, when more than one of the multiple applications and/or multiple application data flows simultaneously have data actively flowing.

* * * * *